3,456,332
Patented July 22, 1969

3,456,332
METHOD OF MANUFACTURING BIMETALLIC WIRE

Khasan Nurievich Belalov, Vladimir Zinovjevich Shub, and Vitaly Konstantinovich Matash, Magnitogorsk, U.S.S.R., assignors to Nauchno-Issledovateljsky Institute Metiznoi Promyshlennosti, Magnitogorsk, U.S.S.R.
Filed Dec. 4, 1964, Ser. No. 415,908
Int. Cl. B21h 7/00; B23k 31/02
U.S. Cl. 29—474.1                    1 Claim

ABSTRACT OF THE DISCLOSURE

A method of manufacturing bimetallic wire in which a cleaned and heated steel core and two aluminum bands applied to the top and bottom of the core are subjected to common plastic deformation by being rolled in consecutive passes consisting of an oval pass, a square pass an octahedral pass and a round pass whereby the bands form a coating on the core.

---

The present invention relates to a process of manufacturing bimetallic wire, and more particlularly to a process of the manufacture of an aluminum coated wire.

The known method of the manufacture of the bimetallic wire by introducing a core into a pipe with the subsequent hot rolling thereof has a number of disadvantages.

To begin with, the cleaning of the inner surface of the pipe, as required to provide for the firm adherence of the coating to the core, presents a fairly complicated technical problem, especially when using small-diameter pipes.

Secondly, for a number of metal couples, such as steel-aluminum and copper-aluminum; it is impracticable to carry out intermediate operations of soft annealing in order to remove cold hardening.

For these reasons, the bimetallic wire from the above metal couples can be manufactured of small-diameter stock that is worked to the specified size without high-temperature heating.

The manufacture of a small-diameter stock of the "core-the-pipe" form, for example, less than 3 to 6 mm. in diameter, is practically impossible, since a process of manufacturing pipes of great length and small diameter with the core introduced into said pipes, is extremely difficult.

An object of the present invention is to remove the above-mentioned disadvantages.

A principal object of this invention is the provision of a process which facilitates the manufacture of bimetallic wire, such as, for example, steel-aluminum, said wire having a coating firmly adhering to the core, said coating being of required thickness and mechanical properties. This object is achieved by the simultaneous rolling in a plurality of passes of the stock, consisting of a core, for example, steel, and two bands, for example, aluminum, that are placed both on the core and underneath it. The plurality of passes provide for large reductions and prevents the widening of the stock.

Owing to the simultaneous plastic deformation of the stock being rolled, there is brought about the firm adherence of the coating to the core. Sometimes, it is considered expedient to effect a preliminary heating in a protective gas atmosphere to facilitate the adherence of the coating to the core.

A general flowsheet of the manufacturing process, the design of a composite stock, and a schematic diagram of the calibrating process are shown in the accompanying drawings, in which.

The proposed process is also expedient for manufacturing bimetallic stock of practically unlimited length, which can also be drawn into the wire.

The necessity of manufacturing bimetallic stock, especially that of a small diameter (about 3 to 6 mm.), arises from the manufacture of bimetals of such metal couples for which the soft annealing on the intermediate reduction stages is impracticable. As an example of such a bimetal may be given steel-aluminum couple. When heated up to temperatures in excess of 480° C., at the border of contact between steel and aluminum there form brittle steel-aluminum intermetallic compounds that do not ensure the firm adherence of steel to aluminum, thus making any further working impracticable.

Figure 1:
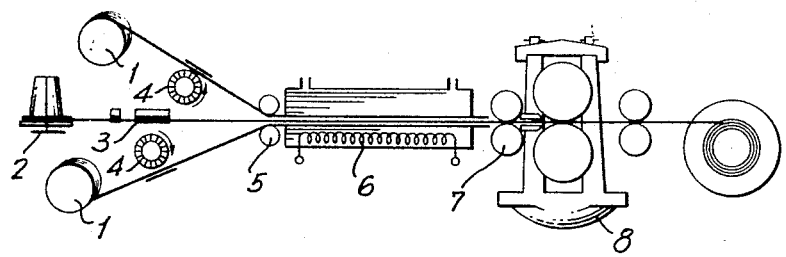
FIG. 1 is a general flowsheet of the process of rolling a composite stock.
Figure 2:
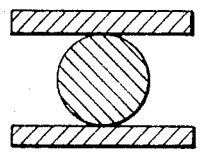
FIG. 2 is a view of the composite stock before rolling.

A process of the manufacture of the bimetallic wire according to the proposed method, is as follows (FIG. 1):

Bands, intended for coating, are unreeled from drums 1; while the core is unreeled from a device 2. Both the core and the bands are passed through respective arrangements 3 and 4 to clean the surfaces of both the core and bands, respectively. In this operation, metal brushes or other special arrangements are used to clean the surface of both the band and core until a metallic luster is produced. A composite stock just before rolling is shown in FIG. 2.

Guide rollers 5 effect the simultaneous feed of a composite stock, consisting of a core and bands, into a heating device 6. Upon passing through the heating device, the bands and the core arrive in the first pass, for example, an oval one. A roller guide 7 prevents the bands from shifting relative to both the core and pass. Owing to plastic deformation when rolling in rolls, and also, in case of necessity, at higher temperatures of preliminary heating (about 350° C.), the coating firmly adheres to the core over the larger portion of the stock perimeter.

As a result of the restricted widening and supporting efforts, as produced by the pass walls, the adherence of metals occurs not only in the zone of maximum strains, but also in the narrow portions of the oval. Even if on rolling in the first pass there occurs no firm adherence over the whole perimeter due to not accurately selected reductions, sizes of passes or stock, the rolling in the subsequent pass, for example, in a square one, ensures the full adherence between metals. According to grades of steel required, the further procedure consists in rolling through corresponding passes, for example, octahedral or round. Upon rolling, the bimetallic stock has the coating firmly adhering to the core, and can easily be further drawn to the required size.

EXAMPLE

In accordance with the present invention, an aluminum coated bimetallic wire up to 0.20 mm. in diameter can be manufactured. The core is a 0.08 percent carbon steel wire 2.0 mm. in diameter. The starting dimensions of a band are as follows: 0.45 mm. thick and 4.0 mm. wide.

The surfaces of the bands and the core were preliminary etched and cleaned until a metallic luster was developed. A 10 percent solution of sulphuric acid was used to etch the core, while the bands were treated with a 10 percent NaOH solution. Upon etching, the bands were cleaned with steel brushes, and the core was drawn through a hard-alloy drawing die provided with sharp edges. The bands and core thus prepared were together placed in a heating tubular furnace. Under a dissociated ammonia gas atmosphere, the stock was heated up to a temperature of 350° C. From the furnace, the composite stock was fed through a roller guide into the first pass of a two-high stand. The roller guide was used to prevent bands from shifting relative to the core, and the whole stock relative to the pass. The diameter of the rolls is 80 mm., and the rolling speed about 5 m. per min. The first oval pass had the following dimensions: width of the oval is 3.9 mm.; height 1.6 mm.; radius 3.0 mm. Upon rolling through the oval pass, there have been formed burrs 0.1 mm. thick that were trimmed by disk shears mounted directly behind the rolling stand. Owing to the deformation in the oval pass over the larger portion of the stock perimeter, there is brought about the firm adherence of the coating to the core. The core is imparted a slightly oval shape, and no peeling of the coating was observed. The oval stock produced is rolled in the square pass, being turned through 90°. The dimensions of the pass are as follows: the diagonal line of the square 2.0 mm. long; the side of the square 1.67 mm.

The square stock is drawn through a die as formed by two pairs of rollers, arranged at right angles to each other and forming an octahedral pass. The further drawing to the specified size is accomplished according to the following schedule: 167–1.48–1.14–0.98–0.85–0.73–0.63–0.54–0.465–0.39–0.35–0.32–0.29–0.26–0.235–0.215–0.199 mm.

Vegetable oil was used as the drawing lubricant. Operations of drawing were effected through hard-alloy dies polished with the diamond powder. The equipment, as used to draw out the aluminum-coated bimetallic wire, did not differ from that employed in ordinary drawing processes Both the square stock and round wire were tested by winding on. These tests have not revealed any peelings, cracks, nor any other coating defects.

The table below shows the results, as obtained by testing the aluminum-coated wire.

TABLE

| Diameter of wire (mm.) | Tensile strength (kg.) | Tensile strength when testing wire with knot (kg.) | Electrical resistance of 1 m. of wire at 20° C. (ohm/m.) | Coating thickness (M) | Winding around the proper diameter of wire | Twisting |
|---|---|---|---|---|---|---|
| 0.20 | 2.8 | 1.7 | 1.7 | 32 | Withstands without failing of the coating. | 34–45 |
| 0.35 | 6.15 | 37 | 1.15 | 58 | ___do___ | 34–45 |

Having thus described our invention, what we claim as new and desire to secure by Letters Patent is:

1. A method of manufacturing bimetallic wire comprising forming a stock consisting of a steel core and two aluminum bands applied to the top and bottom of said core, cleaning the surfaces of the bands and the core, heating the bands and core and then subjecting the core and bands to common plastic deformation by consecutively rolling the same in a system of passes consisting of an oval pass, a square pass, an octahedral pass and a round pass, whereby said bands form a coating on the core, said deformation and heat being sufficient to obtain a strong bond between the coating and said core over the surface of contact therebetween.

References Cited

UNITED STATES PATENTS

| 3,201,862 | 8/1965 | Gotoh | 29—470.1 |
| 3,320,666 | 5/1967 | Dion | 29—480 X |
| 3,331,120 | 7/1967 | Frost | 29—471.7 |
| 3,355,795 | 12/1967 | Clark | 29—497.5 X |

JOHN F. CAMPBELL, Primary Examiner

R. F. DROPKIN, Assistant Examiner

U.S. Cl. X.R.

29—196.2, 488, 497.5, 504